US006879677B2

(12) United States Patent
Trandal et al.

(10) Patent No.: US 6,879,677 B2
(45) Date of Patent: Apr. 12, 2005

(54) METHODS AND SYSTEMS FOR TELEPHONY CALL COMPLETION

(75) Inventors: David S. Trandal, Santa Barbara, CA (US); David J. Brahm, Santa Barbara, CA (US)

(73) Assignee: Callwave, Inc., Santa Barbara, CA (US)

( * ) Notice: Subject to any disclaimer, the term of this patent is extended or adjusted under 35 U.S.C. 154(b) by 450 days.

(21) Appl. No.: 10/029,509

(22) Filed: Nov. 1, 2001

(65) Prior Publication Data

US 2003/0081752 A1 May 1, 2003

(51) Int. Cl.⁷ .............................. H04M 3/42; H04M 1/64
(52) U.S. Cl. .............................. 379/215.01; 379/88.12; 379/207.06; 379/210.01
(58) Field of Search .................. 379/215.01, 88.11, 379/88.12, 207.02, 207.04, 207.05, 207.06, 207.07, 210.01, 211.01, 209.01, 211.02, 219, 220.01; 455/414.1, 415, 518, 519, 566, 575; 370/352

(56) References Cited

U.S. PATENT DOCUMENTS

| | | |
|---|---|---|
| 3,936,613 A | 2/1976 | Nishigori et al. |
| 3,956,595 A | 5/1976 | Sobanski |
| 4,009,337 A | 2/1977 | Sakai et al. |
| 4,022,983 A | 5/1977 | Braun et al. |
| 4,485,470 A | 11/1984 | Reali |
| 4,736,405 A | 4/1988 | Akiyama |
| 4,809,321 A | 2/1989 | Morganstein et al. |
| 4,893,336 A | 1/1990 | Wuthnow ............... 379/211.02 |
| 4,994,926 A | 2/1991 | Gordon et al. ............. 358/400 |
| 5,040,208 A | 8/1991 | Jolissaint |
| 5,046,087 A | 9/1991 | Sakai |
| 5,291,302 A | 3/1994 | Gordon et al. ............. 358/400 |
| 5,404,537 A | 4/1995 | Olnowich et al. |
| 5,434,908 A | 7/1995 | Klein ....................... 379/88.23 |
| 5,459,584 A | 10/1995 | Gordon et al. ............. 358/434 |
| 5,467,388 A | 11/1995 | Redd, Jr. et al. ......... 379/210.02 |
| 5,526,524 A | 6/1996 | Madduri |
| 5,533,102 A | 7/1996 | Robinson et al. .......... 379/88.25 |
| 5,577,111 A | 11/1996 | Iida et al. ............... 379/209.01 |
| 5,583,918 A | 12/1996 | Nakagawa |
| 5,619,557 A | 4/1997 | Van Berkum .......... 379/265.02 |
| 5,640,677 A | 6/1997 | Karlsson |
| 5,651,054 A | 7/1997 | Dunn et al. ............. 379/88.11 |
| 5,751,795 A | 5/1998 | Hassler et al. ........... 379/93.17 |

(Continued)

FOREIGN PATENT DOCUMENTS

WO WO 00 60840 10/2000

OTHER PUBLICATIONS

Johnson, Dave; Article; "Now You're TALKING—voice—response systems for home offices—Product Information"; http://www.findarticles.com; Feb. 1999.

*Primary Examiner*—Benny Tieu
(74) *Attorney, Agent, or Firm*—Knobbe, Martens, Olson & Bear LLP

(57) ABSTRACT

The present invention is directed to processing calls to busy telecommunications lines. In one embodiment, the presence of a subscriber accessing a computer network over a first telephone line via a first computer terminal is detected, wherein the subscriber also has a first telephone station connected to the first line. When a caller calls the first line and the first line is busy, the call is forwarded to a second telephone line associated with a call manager system. The call manager system determines when the subscriber is no longer accessing the computer network. At least partly in response to determining that the subscriber is no longer accessing the computer network, the call manager system transmits a text message to the caller, the message including the subscriber's phone number. The caller can then call back the first line using the transmitted phone number.

75 Claims, 5 Drawing Sheets

U.S. PATENT DOCUMENTS

| | | | |
|---|---|---|---|
| 5,774,067 A | 6/1998 | Olnowich et al. | |
| 5,805,587 A | 9/1998 | Norris et al. | 370/352 |
| 5,809,128 A | 9/1998 | McMullin | 379/215.01 |
| 5,812,551 A | 9/1998 | Tsukazoe et al. | |
| 5,825,867 A | 10/1998 | Epler et al. | 379/215.01 |
| 5,832,060 A | 11/1998 | Corlett et al. | 379/88.19 |
| 5,894,504 A | 4/1999 | Alfred et al. | 379/88.13 |
| 5,946,386 A | 8/1999 | Rogers et al. | 379/265.09 |
| 5,960,064 A | 9/1999 | Foladare et al. | 379/88.26 |
| 5,960,073 A | 9/1999 | Kikinis et al. | 379/265.04 |
| 5,963,629 A | 10/1999 | Jung | |
| 5,995,594 A | 11/1999 | Shaffer et al. | |
| 6,014,436 A | 1/2000 | Florence et al. | 379/211.01 |
| 6,032,051 A * | 2/2000 | Hall et al. | 455/518 |
| 6,034,956 A | 3/2000 | Olnowich et al. | |
| 6,035,031 A | 3/2000 | Silverman | 379/209.01 |
| 6,044,059 A | 3/2000 | Olnowich | |
| 6,078,581 A | 6/2000 | Shtivelman et al. | 370/352 |
| 6,104,800 A | 8/2000 | Benson | 379/215.01 |
| 6,144,644 A | 11/2000 | Bajzath et al. | 370/259 |
| 6,160,881 A | 12/2000 | Beyda et al. | |
| 6,167,127 A | 12/2000 | Smith et al. | |
| 6,169,796 B1 | 1/2001 | Bauer et al. | 379/215.01 |
| 6,178,183 B1 | 1/2001 | Buskirk, Jr. | 370/493 |
| 6,181,691 B1 | 1/2001 | Markgraf et al. | 370/352 |
| 6,212,261 B1 | 4/2001 | Meubus et al. | 379/88.12 |
| 6,230,009 B1 | 5/2001 | Holmes et al. | |
| 6,243,378 B1 | 6/2001 | Olnowich | |
| 6,253,249 B1 | 6/2001 | Belzile | 709/249 |
| 6,278,704 B1 | 8/2001 | Creamer et al. | 370/352 |
| 6,304,565 B1 | 10/2001 | Ramamurthy | |
| 6,350,066 B1 | 2/2002 | Bobo, II | 709/206 |
| 6,353,663 B1 | 3/2002 | Stevens et al. | 379/114.22 |
| 6,405,035 B1 | 6/2002 | Singh | 455/414.1 |
| 6,411,601 B1 | 6/2002 | Shaffer et al. | |
| 6,411,805 B1 | 6/2002 | Becker et al. | |
| 6,438,216 B1 | 8/2002 | Aktas | 379/88.01 |
| 6,438,222 B1 | 8/2002 | Burg | |
| 6,477,246 B1 | 11/2002 | Dolan et al. | 379/211.02 |
| 6,496,576 B2 | 12/2002 | Tanaka et al. | |
| 6,501,750 B1 | 12/2002 | Shaffer et al. | |
| 6,510,162 B1 | 1/2003 | Fijolek et al. | |
| 6,512,930 B2 * | 1/2003 | Sandegren | 455/518 |
| 6,519,258 B1 | 2/2003 | Tsukazoe et al. | |
| 6,546,087 B2 | 4/2003 | Shaffer et al. | |
| 6,549,612 B2 | 4/2003 | Gifford et al. | 379/67.1 |
| 6,567,505 B1 | 5/2003 | Omori et al. | |
| 2002/0097710 A1 | 7/2002 | Burg | |

* cited by examiner

METHODS AND SYSTEMS FOR TELEPHONY CALL COMPLETION

BACKGROUND OF THE INVENTION

1. Field of the Invention

The present invention is related to methods and systems for telecommunications, and in particular, to methods and systems for processing calls.

2. Description of the Related Art

Conventional corporate enterprise switching systems, such as PBX systems, offer features to make the calling process more convenient. One such feature, termed a callback or campon feature, is used when a caller calls a telephone station that is busy. The callback process determines when the called telephone station is no longer busy and then calls the caller and the called party. In particular, if the called party's telephone line is busy when called, the caller can, via a keypad command, instruct the enterprise telephone system to automatically call the called party's telephone when the called party's telephone line is idle. The telephone system notifies the caller that the called party's telephone is idle by ringing the caller's telephone in a unique manner. If the caller then answers the telephone, the called party's telephone is automatically called and connected to the caller's telephone.

The callback feature relieves the caller from the aggravation and wasted time resulting from repeated attempts to place a call to a busy line, hoping that the line will free up. Unfortunately, the techniques used to accomplish the callback feature within an enterprise switching system, such as a PBX system, are not applicable to other telephone systems, such as cellular phone systems. Further, many conventional systems that do provide callback features outside of an enterprise system are very limited in where they can be located. For example, these conventional systems may need be located at a local exchange of the calling party or between the calling party and the local exchange, and typically also are burdened with having to intercept all the callers calls at the point of origination. Further, these types of conventional systems require that the caller be a callback feature subscriber. Other conventional systems simply repeatedly retry the called number in order to determine when the called line is idle, which is an inefficient use of telephony resources. In addition, in order to perform a callback, many conventional systems are burdened with having to perform a call bridging operation. Hence, conventional telecommunications systems fail to offer the callback feature for many telephony applications.

SUMMARY OF THE INVENTION

The present invention is related to methods and systems for providing a callback or camp-on notification to a caller in response to determining that a called busy line has transitioned to an idle state.

For example, a user may utilize a telephone line to access a network via a dial-up connection. Upon performing the dial-up connection, the user's telephone line will transition from an idle state to a busy state and will not accept incoming calls. Instead, incoming calls are forwarded to a call processing system. By way of example, if a caller using a wireless, text message-enabled telephone calls the user's telephone line, the call will be forwarded to the call processing system. Based at least in part on receiving the forwarded cal, the call processing system determines that the user's phone line is busy. The call processing system may allow the caller to leave a voice message and/or may inform the caller that the called line is busy.

The call processing system then determines when the user has ceased accessing the network. Upon determining that the user has ceased accessing the network, the call processing system infers that the user's telephone line is now idle and transmits a corresponding text message to the caller's wireless phone. The text message includes the user's telephone number. The caller can proceed to call the now-idle telephone line without having to renter the user's telephone number. Instead, the caller can press a "send" key, a "talk" key, or the like, on the caller's telephone and the telephone will automatically dial the user's phone number. The call will then be completed. Advantageously, the caller does not have to be a subscriber to the call processing system to use the callback notification process.

An example callback process in accordance with the present invention will now be described in greater detail. A call manager subscriber goes online by accessing the Internet or other computer network. The subscriber can access the network using a dial-up connection via a computer terminal equipped with a modem. This will result in the subscriber's telephone line being busy. A client program executing on the computer terminal logs onto a call manager system over the Internet. The client application provides an online presence indication to the call manager system, enabling the call manager to determine that the subscriber is still online. To better manage incoming calls while the subscriber's telephone line is busy, the subscriber's line is configured to have calls forwarded to the call manager system using a "Call Forward On Busy" function when the subscriber's line is busy.

A calling party calls the subscriber's phone line using, by way of example, a wireless telephone. Because the subscriber's line is busy, the calling party's call is forwarded to the call manager system over a PSTN along with corresponding signaling information. The signaling information includes the calling party's phone number derived through SS7 signaling or by forwarding the call to a toll-free number. Because the calling party's call is being forwarded to the call manager system, the call manager system determines or infers that the subscriber's phone line is busy.

The call manager system answers the calling party's call and optionally informs the caller that the called line is busy and/or allows the calling party to record a voice message on the call manager system. In addition, the call manager system optionally asks the subscriber whether a camp-on request should be allowed or denied.

The call manager system determines when the subscriber has gone offline, that is, no longer accessing the Internet. The determination can be based on a log-off message from the called party's computer terminal client program, or on the failure of the client program to send an appropriate presence indication to the call manager system. If the subscriber has gone offline, a notification is sent to the calling party's calling station informing the calling party that the calling party's call can now be completed. The message includes the caller's phone number and other text and/or graphics, including instructions on how to complete the call.

If the notification is to be provided as an SMS (short message service) alphanumeric message, then based on the calling number and using an SMS database or other databases, such as a Local Exchange Routing Guide, the call manager system determines if the calling number is associated with a wireless phone, such as a cellular phone. If the calling number is associated with a wireless phone, the call manager determines the carrier associated with the caller's calling station. SMS is a wireless messaging service that enables the transmission of alphanumeric messages between mobile subscribers and external systems such as voice mail systems, electronic mail system and paging systems.

If the call manager has determined that the calling party's station is a wireless phone, the call manager infers that an email address associated with the caller is the caller's telephone number "@" the carrier name. For example, if the incoming call is from telephone number "310-555-5555" and is associated with a carrier "CarrierX, with the Internet domain "carrierx.com", then it is inferred that the caller's email address associated with the caller's cellular phone is 3105555555@carrierx.com. The call manager system emails the notification, including the called party's phone number, to the inferred or queried email address via SMS or other messaging system.

After receiving the notification, if the calling party enters the appropriate command the cellular phone automatically calls the subscriber's number, and if the subscriber answers, the call is completed. The command may be entered via the cellular phone keypad key, such as the "talk" or "send," or via a voice command if the phone is voice command enabled. In another embodiment, upon detecting that the called party's line is free, the call manager system automatically initiates a call bridging operation connecting the calling and called party.

Another embodiment of the present invention is an automated callback system, comprising: at least a first instruction configured to detect that a called party is accessing the Internet via a computer terminal using a first line; at least a second instruction configured to determine when the first line is busy, wherein the first line is busy because the computer terminal is using the first line; at least a third instruction configured to detect when the caller is using a wireless telephone to call the first line; at least a fourth instruction configured to determine when the first line is idle based at least in part on determining that the computer terminal has ceased accessing the Internet; and at least a fifth instruction configured transmit a short message service (SMS) callback notification via email to the wireless telephone at least partly in response to the at least fourth instruction determining that the first line is idle, the callback notification including the called party's phone number.

Still another embodiment of the present invention is a method of processing a telecommunications call, the method comprising: detecting a presence of a first subscriber communicating on a computer network via a first computer terminal, wherein the first computer terminal communicates over the computer network using a first telecommunications line associated with a first telephone number; receiving a first call from a first caller calling via a wireless station, wherein the first call was initially directed to the first telecommunications line and then forwarded to a second telecommunications line because the first telecommunications line is busy, wherein the first telecommunications line is busy because the first computer terminal is using the first telecommunications line; receiving signaling information associated with the first call, the signaling information including at least a second telephone number, the second telephone number associated with the wireless station; determining when the first subscriber has ceased communicating on the computer network using the first computer terminal; and transmitting to the wireless station a message at least party in response to determining that the first subscriber has ceased communicating on the computer network, the message including an instruction related to calling back the first telephone number.

Yet another embodiment of the present invention is a method of processing a telecommunications call, the method comprising: detecting a presence of a first subscriber accessing a computer network via a first computer terminal connected to a first telephone line; receiving from a calling telephone station a forwarded call intended by a caller for the first telephone line; receiving signaling information associated with the forwarded call, the signaling information including at least a telephone number associated with the calling telephone station; providing an indication to the calling telephone station that the first telephone line is busy; determining when the first subscriber is no longer accessing the computer network via the first computer terminal; and at least partly in response to determining that the first subscriber is no longer accessing the computer network via the first computer terminal, transmitting a first notification to the first caller, the first notification including callback information.

One embodiment of the present invention is a method of call processing, comprising: detecting that a first user is accessing a computer network using a first line; detecting that a second user is calling the first user when the first user's line is busy and the first user is accessing the computer network; determining that the second user is calling using a wireless station; detecting that the first user has ceased accessing the computer network; and at least partially in response to detecting that the first user has ceased accessing the computer network, enabling the second user to call the first line via the wireless station using a single key entry.

Another embodiment of the present invention is a call processing system, comprising: a first instruction configured to detect when a first user is accessing a computer network using a first line; a second instruction configured to detect when a second user is calling the first user when the first line is busy; a third instruction configured to determine that the second user is calling using a wireless station; a fourth instruction configured to detect that the first user has ceased accessing the computer network; and a fifth instruction configured to transmit callback information to the wireless station at least partially in response to the fourth instruction detecting that the first user has ceased accessing the computer network.

Still another embodiment of the present invention is a method of providing line status information, comprising: receiving over a network presence information from a client application executing on a computer system accessing a first telephone line; receiving on a second telephone line a call intended by a caller to be connected to the first telephone line, wherein the call was forwarded to the second telephone line at least in part due to the computer system accessing the first telephone line; determining that computer system has ceased accessing the first telephone line; and transmitting a text notification to the caller at least partly in response to determining that computer system has ceased accessing the first telephone line.

Yet another embodiment of the present invention is a method of providing line status information, comprising: receiving over a network presence information from a client application executing on a computer system accessing a first telephone line; receiving on a second telephone line a call intended by a caller to be connected to the first telephone line, wherein the call was forwarded to the second telephone line at least in part due to the computer system accessing the first telephone line; determining that computer system has ceased accessing the first telephone line; and bridging a call between the first telephone line and the caller at least partly in response to determining that computer system has ceased accessing the first telephone line.

Another embodiment of the present invention is a calling system, comprising: a call manager system configured to receive presence information from a client application executing on a computer system accessing a first telephone line, and configured to receive a forwarded call intended by a caller to be connected to the first telephone line, wherein the call manager is further configured to determine that the computer system has ceased accessing the first telephone line and to transmit a notification to the caller at least partly in response to determining that computer system has ceased accessing the first telephone line; and the client application, wherein the client application is configured to provide the presence information to the call manager system.

Thus, the present invention provides systems and methods for a callback process that can be used with PSTN systems, wireless stations and the Internet, to thereby greatly facilitate call completion.

BRIEF DESCRIPTION OF THE DRAWING

These features will now be described with reference to the drawings summarized below. These drawings and the associated description are provided to illustrate preferred embodiments of the invention, and not to limit the scope of the invention.

DETAILED DESCRIPTION OF PREFERRED EMBODIMENTS

Figure 1:
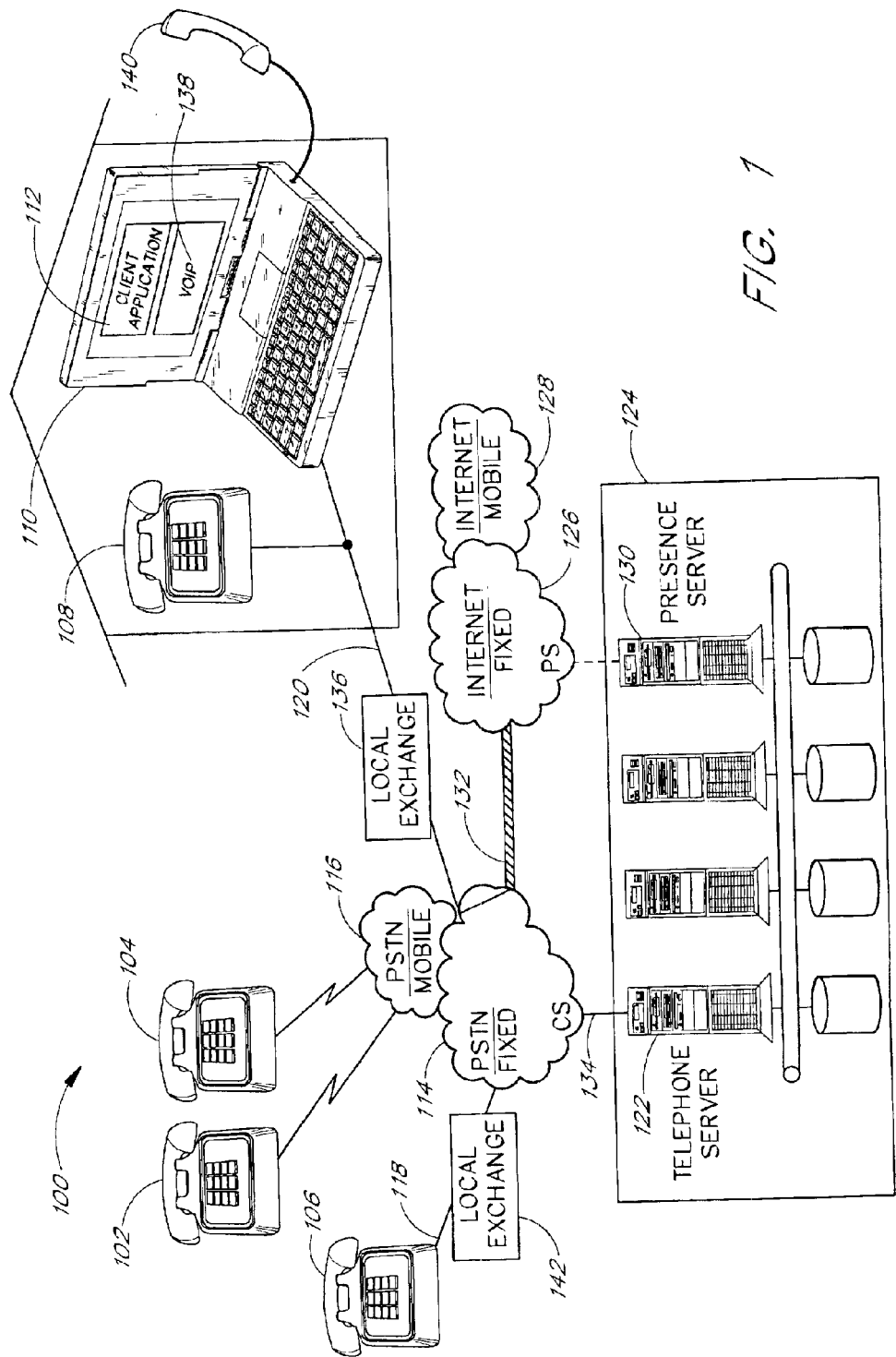
FIG. 1 illustrates an example telecommunications system in accordance with one embodiment of the present invention.

The present invention is related to methods and systems for detecting and notifying a caller when a called busy telecommunications line transitions from a busy state to an idle state. In particular, one embodiment of the present invention advantageously provides a callback notification system for wireless communication devices, such as cellular phones, as well as for wireline communication devices.

For example, when a user utilizes a telephone line to access a computer network via a dial-up connection, the telephone line will transition to a busy state and will not accept incoming calls. Instead, the line can be provisioned through the local phone company to forward incoming calls to a call processing system. By way of example, if a caller using a wireless, text message-enabled telephone calls the user's telephone line, the call will be forwarded to the call processing system. Based at least in part on receiving the forwarded call, the call processing system determines that the user's phone line is busy.

The call processing system then determines when the user has ceased accessing the computer network. Upon determining that the user has ceased accessing the computer network, the call processing system infers that the user's telephone line is now idle and transmits a corresponding text message to the caller's telephone. The text message includes the user's telephone number. The caller can proceed to call the now-idle telephone line without having to re-enter the user's telephone number. Instead, the caller can press a "send" key, a "talk" key, or the like, on the caller's telephone and the telephone will automatically dial the user's phone number. The call will then be completed. Thus, utilizing the present invention, the caller is spared from having to repetitively attempt to call the user in the hopes that the called line will free up. Further, the caller advantageously does not have to be a registered user of the call manager system or of the callback function. Various embodiments of the invention are discussed in greater detail below.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. However, the present invention can also be implemented using special purpose computers, state machines, and/or hardwired electronic circuits. In addition, a communications line is referred to as "busy" when the communication line is being utilized in such a way that a conventional incoming call will not be connected to the communications line. Thus, for example, if a user is utilizing a conventional line capable of only conducting one of a conventional voice session and a data session, but not both at the same time, for a data session, the line will be busy.

FIG. 1 illustrates an example telecommunications system 100 that can be used in accordance with the present invention. As illustrated, the telecommunications system 100 includes a plurality of users having corresponding telephone physical lines or wireless "lines" connected to telephone stations 102–108. The telephone stations can be wireless, such as stations 102, 104, or wired, such as stations 106, 108. The wireless stations 102, 104 can be, for example, CDMA wireless phones. The wired stations 106, 108 are connected via telephone lines 118, 120 to a PSTN 114 configured to process calls from fixed or standard telephone stations. The wired stations 106, 108 can be conventional POTS (Plain Old Telephone System) telephones or text-message enabled phones.

The telephone lines 118, 120 may be shared with one or more computer terminals 110. The computer terminal 110 can be a personal computer having a monitor, keyboard, a disk drive, and a modem, such as a standard V.90 56K dial-up modem. The modem can optionally be configured to dial-up a number under control of an application, such as a contact manager application or telecommunications client application phone dialer, stored and executing on the computer terminal 110. In addition, the computer terminal 110 can be an interactive television, a networked-enabled personal digital assistant (PDA) or the like. Residing and executing on the computer terminal 110 is a soft switch telecommunications client application 112. The client application 112 is used to provide enhanced communication services, as discussed in greater detail below. The client application 112 is connected to and communicates with a call manager system 124 via the Internet 126 or the like. The call manager 124 includes a server-based session manager subsystem that maintains session status across the client sessions.

In addition, the computer terminal 110 can be equipped with VoIP (Voice over Internet Protocol) software 138 and a handset 140, including a microphone and speaker, allowing voice communications to be conducted over the Internet 126 using Internet Protocol. VoIP communicates data via packet switching, which opens a connection just long enough to send a packet of data, including digitized voice data. In particular, the computer terminal 110 divides the voice data into small packets. Each packet includes a destination address informing the network where to send the packet. If the receiving station is also a VoIP terminal, then when the receiving terminal receives the packets, VoIP software executing on the receiving terminal reassembles the packets into the original data stream. The data stream is then converted to a voice signal. If the receiving station is a conventional telephone, then a VoIP gateway converts the packets into a voice signal which is then connected to the conventional telephone.

In one embodiment, the VoIP process is performed using the H.323 standardized protocol established by the International Telecommunications Union (ITU). Advantageously, H.323 provides specifications for real-time, interactive videoconferencing, data sharing and audio applications such as IP telephony. Alternatively, the Session Initiation Protocol (SIP), established by the Internet Engineering Task Force (IETF), can be used. SIP is generally more efficient than the H.323 protocol as SIP is specifically intended for IP telephony.

The telephone lines 118, 120 can be used to establish a dial-up connection for computer terminals, such as terminal 110 via the modem, to an Internet Service Provider (ISP).

In particular, the telephone stations 106, 108 and/or computer terminal 110 are coupled via the fixed PSTN 114 to corresponding local exchange switches 136, 142, used to connect and route calls, and to and from local exchange switches and remote exchanges via tandem switching offices of the fixed PSTN 114. The telephone stations 106, 108 are connected to a telephone server system 122 in the call manager system 124, via the fixed PSTN 114 through a trunk system 134. Thus, advantageously the call manager system 124 does not have to be coupled to the same local exchange as the calling or called terminal. Indeed, the call manager system 124 can be located in a different country than the called and calling parties. This provides much greater flexibility than many conventional systems offering some type of callback function, which have to be located between the calling station and the calling station's local exchange.

The call manager system 124 optionally hosts a Web site used by subscribers of the call manager system 124 to setup and manage their accounts. Other embodiments of the call manager system 122 are described in U.S. patent application Ser. No. 09/539,375, filed Mar. 31, 2000, the contents of which are incorporated herein in their entirety by reference. The call manager system 122 is optionally configured as, or to appear as, a telephone central office and can interface with the PSTNs 114, 116 as a Class 5 switch.

The telephone trunk system 134 has associated signaling channels. The present invention is not limited to a particular signaling convention. For example, as illustrated, the present invention can be utilized with a Common Channel Signaling system, such as Signaling System 7 (SS7), having separate voice/user data and signaling channels. In addition, the present invention can be used with other signaling methods, such as ISDN, Advanced Intelligent Network (AIN), and/or inband signaling. The selected signaling system provides caller identification, wherein the caller's telephone number is provided to the called party. Thus, for example, ANI (Automatic Number Identification) information is provided, wherein the caller's local telephone company transmits the calling or billing telephone number along with the call.

The wireless stations 102, 104 are coupled to a PSTN 116, configured to handle mobile, wireless stations via wireless communications towers configured to broadcast and receive cellular radio frequency communications. The wireless towers can be, for example, CDMA or GSM cellular mobile base stations. The PSTN 116, in turn, is connected to the call manager system 124 via the trunk system 134. The call manager system 124 can communicate via the Internet mobile 128 with other Internet capable devices, including wireless stations 102, 104, configured to receive Internet communications, including, but not limited to, text messages.

When a user attempts to place a call via station 102 to station 108, the call is routed through a mobile base station system to the PSTNs 114, 116. If the line 120 for station 108 is busy, the PSTN 114 forwards the call to a local or toll-free number associated with the call manager system 124. The call manager 124 then processes the call as described in greater detail below. This is in contrast to many conventional systems providing a callback feature, wherein these conventional callback systems must be positioned between the calling terminal and the calling terminal's local exchange and then must intercept calls from the calling terminal. By contrast, one embodiment of the present invention can optionally be located remotely from the local exchange switch and does not have to be positioned between the local exchange switch and the calling station.

Figure 2:
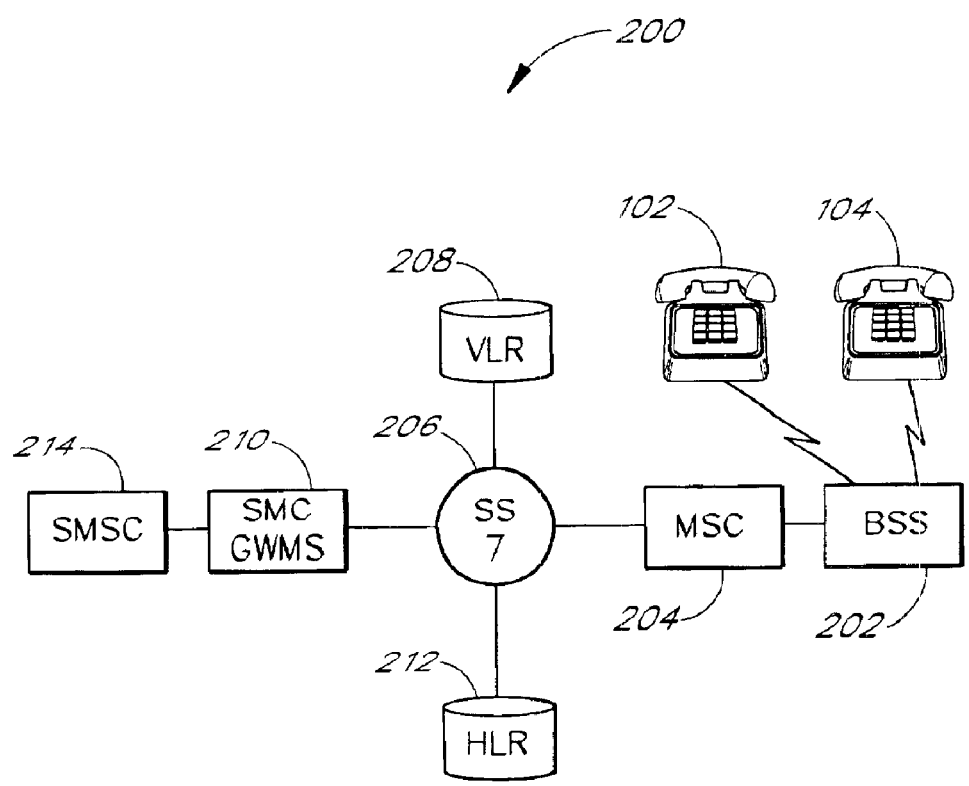
FIG. 2 illustrates an example message communication system.

FIG. 2 illustrates an example message communication system 200 used to communicate text messages between the call manager system 124 and SMS (short message service) enabled stations, such as the wireless stations 102, 104. SMS is a wireless messaging service that enables the transmission of alphanumeric messages between mobile subscribers and external systems such as voice mail systems, electronic mail system and paging systems. Of course other messaging protocols, such as the Wireless Application Protocol (WAP), can be used with appropriately equipped wireless stations. Advantageously, WAP enables wireless devices to display and use hypertext documents and provides wireless Internet access via a minibrowser executing on the wireless device.

The wireless stations 102, 104 communicate via a base station system (BSS) 202 to a mobile switching center (MSC) 204 to the SS7 signaling network 206. A visitor location register (VLR) database 208, containing temporary subscriber information, is coupled to the MSC 204 via the SS7 signaling network 206. The VLR database 208 includes temporary information concerning the mobile subscribers that are currently located in a given MSC serving area, but whose Home Location Register (HLR) 212 is stored outside the MSC serving area.

A short message service center (SMSC) 214, configured to store and forward messages between a mobile station, such as the wireless stations 102, 104 and other SMS enabled entities, is coupled to the SS7 signaling network 206 via an SMS mobile switching center gateway 210. The SMS mobile switching center gateway 210 queries the HLR database 212 for routing information and delivers text messages. The HLR database 212 contains mobile subscriber information for the wireless carriers' subscribers. HLR subscriber information includes a unique subscriber identifier, service subscription information, location information, including the identity of the current VLR, to enable the routing of mobile-terminated calls, and other service information.

The call manager system 124 manages communications with the client application 112. If the call manager 124 requests that the user enters commands via touch tone entries, the call manager system 124 optionally records and stores a log of the touch-tone entries. The call manager requests can be in the form of voice prompts that guides the user to through the appropriate callback options. In addition to providing the callback function, the call manager system 124 can be configured to perform additional functions, such as acting as a telephone answering system that answers call, plays outgoing messages and records incoming messages.

One such Internet answering system is operated by CallWave, Inc. As is well known in the field of Internet telecommunications, CallWave, Inc. provides an Internet digital answering service that works with the "Call Forward On Busy" feature of a standard phone line to answer calls while the subscriber is online and is using the phone line to access the Internet. Once activated, callers no longer get annoying busy signals when the subscriber is online. Instead, callers hear a brief greeting after which they can leave a short message. The recording can be streamed in substantially real-time or sent within seconds after recording has completed to the subscriber over the Internet.

The call manager system 124 is connected to the Internet 126, 128 as a computer host. As previously discussed, the call manager system 124 can also host a Web site used to manage subscriber accounts. When a user or subscriber connects to the Internet using, for example, a dial-up ISP, the telecommunications client application executing on the subscriber's computer terminal can make the subscriber's online presence known to the call manager system 124. In particular, the call manager system 124 includes a presence detection system 130 that communicates with the client application 112 executing on the computer terminal 110 to determine whether the computer 112 is online. Presence detection can be performed by the presence detection system 130 polling or pinging the computer terminal 110 via the client application 112, or by the client application transmitting an "I'm alive" message and subsequent periodic "keep alive" messages to the presence detection system 130.

A user can access a data network, such as the Internet 126, by establishing a telephone dial-up connection to an ISP. The Internet 126 is coupled to the PSTNs 114, 116, via a trunk or backbone system 132. Text, graphic and voice communications can be communicated between the call manager system 122 and the computer terminal 110. For example, communications are transmitted from the call manager system 122 over the PSTN 114, via the trunk system 132 to the computer terminal 110 via the Internet 126. Similarly, communications are transmitted from the computer terminal 110, over the Internet 126, through trunk system 132 to the telephone and presence servers 122, 130. The user is preferably a registered subscriber to the call manager system 124.

Figure 3:
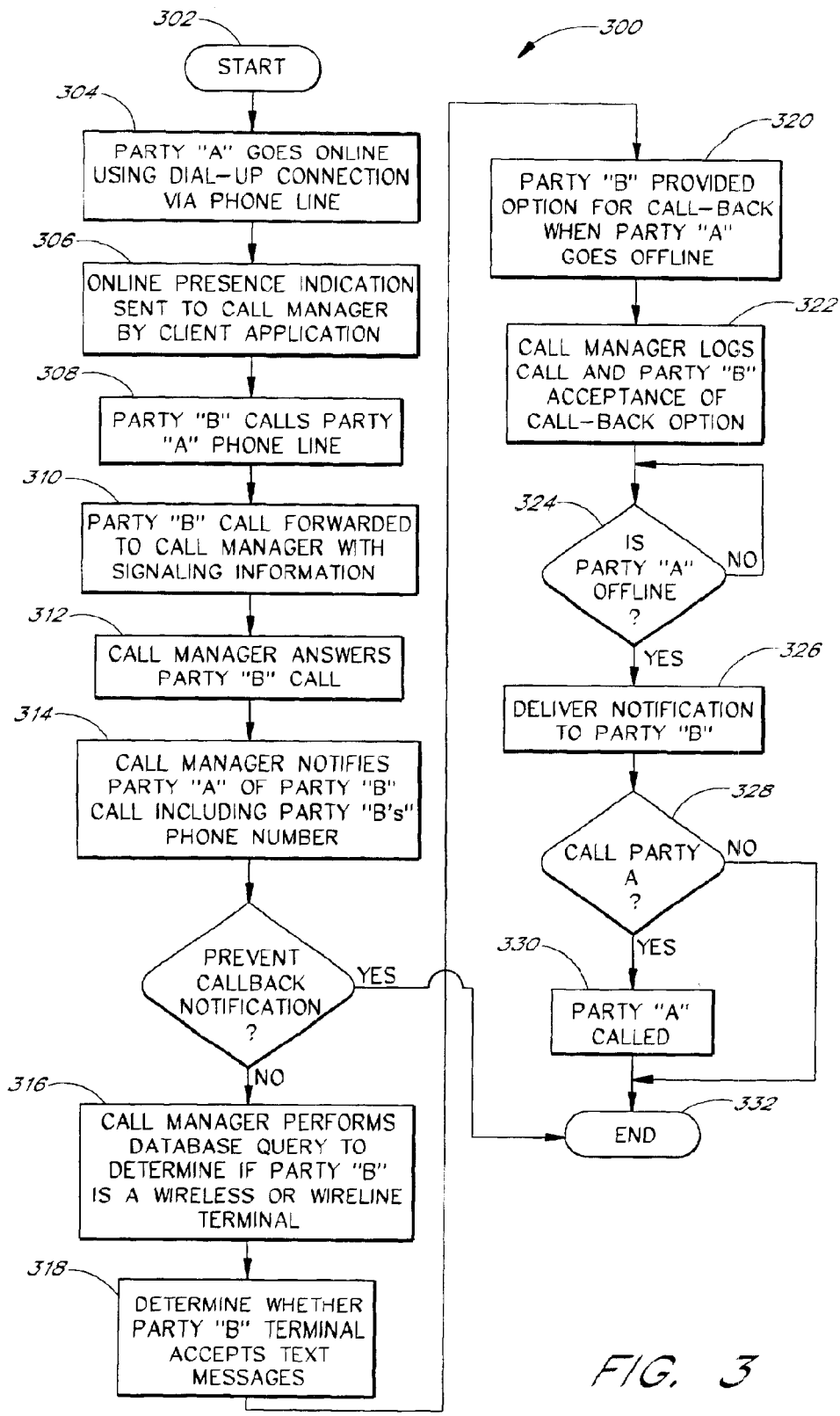
FIG. 3 illustrates an example callback process in accordance with the present invention.

FIG. 3 illustrates an example callback process 300 for a calling party, referred to as Party B, and a called party, referred to as Party A. Beginning at start state 302, the process 300 proceeds to state 304. At state 304, Party A goes online by accessing the Internet via a computer terminal. As similarly discussed above, Party A may be using a computer terminal, such as terminal 110 illustrated in FIG. 1, to access the computer network, such as the Internet 126 or a private Wide Area Network (WAN). If Party A has a call waiting feature, in this example the call waiting feature is turned off for the current network access session. This ensures that the network access by the computer terminal is not interrupted by an incoming call. Thus, if someone attempts to call Party A's line during the network accession, the line will be busy.

A client program, such as the telecommunications client application 112 discussed above, executing on the computer terminal logs onto the call manager system over the Internet. Information that may be communicated as part of the logon process includes one or more of the user's account number, IP address, and other user attributes. It is assumed that Party A's line is configured to have calls forwarded by Party A's local exchange using a "Call Forward On Busy" function. The calls are forwarded to a call manager system, such as call manager system 124 discussed above, when the line is busy. At state 306, the telecommunications client application provides an online presence indication to the call manager system.

At state 308, Party B calls Party A's phone line using, by way of example, the wireless station 102 or 104. At state 310, Party B's call is forwarded to the call manager system over the PSTN, such as PSTN 114, along with signaling information. The signaling information includes Party B's phone number. Optionally, if Party A does not have calling forwarding activated, Party B can directly dial the call manager system via a local or toll free number and the call manager system will answer the call and receive the signaling information, including Party B's phone number.

At state 312, the call manager system answers Party B's call. Optionally, Party B can record a voice message on the call manager system. If Party A is still online, at state 314 the call manager system optionally notifies Party A of Party B's call and transmits or streams the voice message, if any, from Party B. The notification can be provided in substantially real-time via the telecommunications client application and displayed on the computer terminal monitor. In particular, the call manager can transmit the notification over the Internet to the telecommunications client application and to Party A's computer terminal for display. The voice message can be streamed over the Internet to the computer terminal at the same time the notification is displayed by the telecommunications client application.

Alternatively, the call manager looks up Party A's email address in a subscriber database and then emails the notification and voice message to Party A's email address. The notification can also be provided using an instant messaging system or a web page banner. The notification optionally includes Party B's phone number. In addition, the call manager can access a reverse number database or a contact database associated with Party A to locate a name or other identifier associated with Party B's phone number. If a corresponding name or other identifier is located, it can be included in the notification provided to Party A.

Optionally at state 315, Party A is asked if he or she wants to decline to have a notification provided to Party B's once Party A frees up the line. If Party A does decline to have the notification provided to Party B, the automated callback notification process is terminated at state 332, though any recorded voice message from Party B can still be transmitted to Party A. If Party A agrees to have the notification provided to Party B, the process proceeds from state 315 to state 316.

If more then one call comes in when while Party A's line is busy, a message listing all the calls missed during the Party A's current online session is transmitted to Party A's computer terminal. Party A can then select from the list, which caller or callers are to receive a notification once Party A goes offline. A message is optionally transmitted to the other, non-selected callers informing them that a line-idle notification will not be provided. Party A can still listen to messages left by all the callers.

Party A can also be provided the option to connect immediately to Party B via a handset coupled to the computer terminal using VoIP software executing on the computer terminal or via a conventional telephone. The computer terminal's modem dials the call manager system via the conventional PSTN, and the call manager then bridges the two calls.

A message is optionally sent to Party B, asking if Party B would like to be notified when Party A's line is idle. The message can be provided as a voice, text, or graphic message that instructs Party B on how to provide a response. If the notification is to be provided as an SMS alphanumeric text message, then at state 316, based on the calling number and using an SMS database or other databases, such as the Local Exchange Routing Guide, the call manager system determines if the calling number is associated with a cellular phone or a conventional telephone station and the carrier associated with the caller's calling station. The Local Exchange Routing Guide (LERG) provides information from Local Exchange Carrier to Inter-exchange carriers for routing and trunking between networks based on a number's area code and prefix. With the increasing popularity of SMS (short message service), in one embodiment the call manager assumes or determines at state 318 that the calling station is SMS enabled and that the SMS function is activated.

If the call manager has determined that Party B's calling station is an SMS enabled station, the call manager infers that an email address associated with the caller is the caller's telephone number "@" the carrier name. For example, if the incoming call is from a number "310-555-5555" and is associated with a carrier "CarrierX,", with the Internet domain "carrierx.com", then it is inferred that the caller's email address associated with the caller's cellular phone is 3105555555@carrierx.com. In another embodiment, using the ENUM protocol, Party B's phone number is mapped directly to the calling station's email address. ENUM is an Internet Engineering Task Force (IETF) protocol (RFC 2916) that resolves fully qualified telephone numbers to fully qualified domain name addresses using a DNS-based architecture. At state 320, the call manager system optionally emails a message to the inferred email address via SMS or other messaging system. The message provides Party B with the option for having a callback notification transmitted to Party B when Party A's line becomes idle.

For example, Party B can optionally be instructed by the message to press a "#" key on Party B's calling station keypad if Party B wants to be notified when the subscriber's line goes idle, and to press a "*" key if Party B does not want to be notified when the subscriber's line goes idle. In another example embodiment, Party B provides a voice indication as to whether Party B is to be notified when the subscriber's line goes idle. Assuming that Party B requests notification, Party B's notification request is logged by the call manager system at state 322. Otherwise, if Party B declines to be notified, Party B is offered the option to leave a voice message, which will be recorded by the call manager for later playback to the subscriber. The action of notifying calling Party B is independent of whether Party B did or did not leave a message. Thus, for example, Party B may first be offered the option of recording a voice message, and then asked if an idle line notification is to be sent.

At state 324, the call manager system determines if Party A has gone offline, that is, no longer accessing the Internet. The determination can be based on the failure of the telecommunications client application to send an appropriate presence indication to the call manager system or based on the telecommunications client application transmitting a log-off message. If Party A has gone offline, at state 326 a notification is sent to Party B's calling station informing Party B that Party B's call can now be completed. The message includes the calling party's phone number, and optionally the Party A's name and text and/or graphics informing Party B that Party A's line is now free.

A determination is made at state 328 by software executing on Party B's calling station as to whether Party B wants to be connected to Party A. If Party B responds in the affirmative, via a keypad button, such as the "talk" key, the "send" key, or via voice commands, then at state 330 the calling station automatically calls Party A's number using the phone number provided in the message, and if Party A answers, the call is completed. The process ends at state 332.

In another embodiment, rather than transmitting the message at state 320 and receiving the response at state 322, the call manager system automatically proceeds to state 324 and transmits the notification at state 326. In still another embodiment, rather than send another message to Party B at state 326 and performing the determination at state 328, the callback is automatically initiated by the call manager using a bridging operation after determining that Party A has gone offline. Alternatively, rather than send another message to Party B at state 326 and performing the determination at state 328, the callback is automatically initiated by the call manager using a call bridging operation after determining that Party A has gone offline. The call manager system first calls Party B's phone number Next, the call manager system calls Party A's line and bridges Party A with Party B. Other bridging techniques which are well known to those of ordinary skill in the industry, and hence not explained in detail herein, can be used as well. Advantageously, in one embodiment a calling party does not have to be a subscriber to the call manager system and does not have to pay extra or register to have the callback function performed using the process 300.

Figure 4:
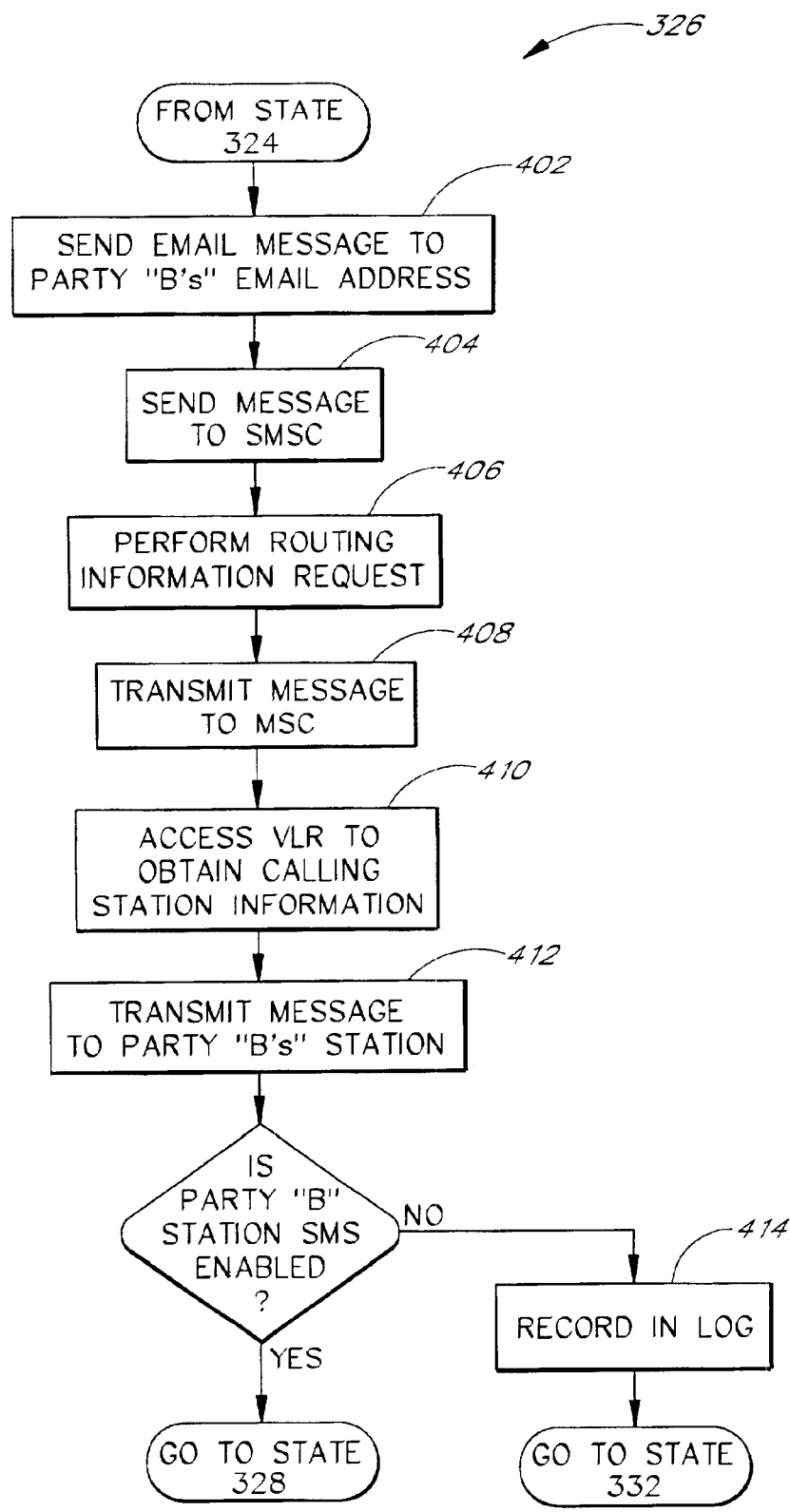
FIG. 4 illustrates and example process of sending an SMS message.

FIG. 4 illustrates in greater detail the notification delivery process of state 326 using SMS. If Party B's calling station is a mobile, SMS enabled station, then the message is sent to the calling station as follows. The message is sent by the call manager system to the appropriate email address at state 402. The message is then transmitted to a short message service center (SMSC), such as SMSC 214 illustrated in FIG. 2, at state 404. At state 406, the SMSC performs a routing information request by querying a home location register (HLR) database, such as HLR 212, and receives routing information, including identification of a service mobile switching center for the mobile calling station. At state 408, the SMSC transmits the message to a mobile switching center (MSC), such as MSC 204, using a point-to-point forward short message operation.

The MSC accesses calling station information at state 410 from a visitor location register (VLR) database, such as VLR 208. The MSC then transmits the message to Party B's calling station via a base station system (BSS), such as BSS 202, at state 412. The MSC provides the SMSC the forward message operation status at state 414. If the forward message operation was not successful, a retry operation can be performed. If the status indicates that Party B's station is not SMS enabled, the call manager system logs this information in a caller database at state 416. In one embodiment, the status of returned email is tracked. For example, if an email is "bounced" or returned with an "address unknown" status, this information is stored in a call manager database so that for future calls placed from Party B's calling station, the call manager system will not attempt to send SMS text messages to Party B's calling station. If an email to an address is "bounced" returned with a "mailbox full" status message, this information is logged and the status is treated as a transient case, wherein the call manager will attempt to send future emails to that address. In addition, if an email notification is bounced, the called party is optionally so notified so that Party A will not expect a callback from Party B.

Figure 5:
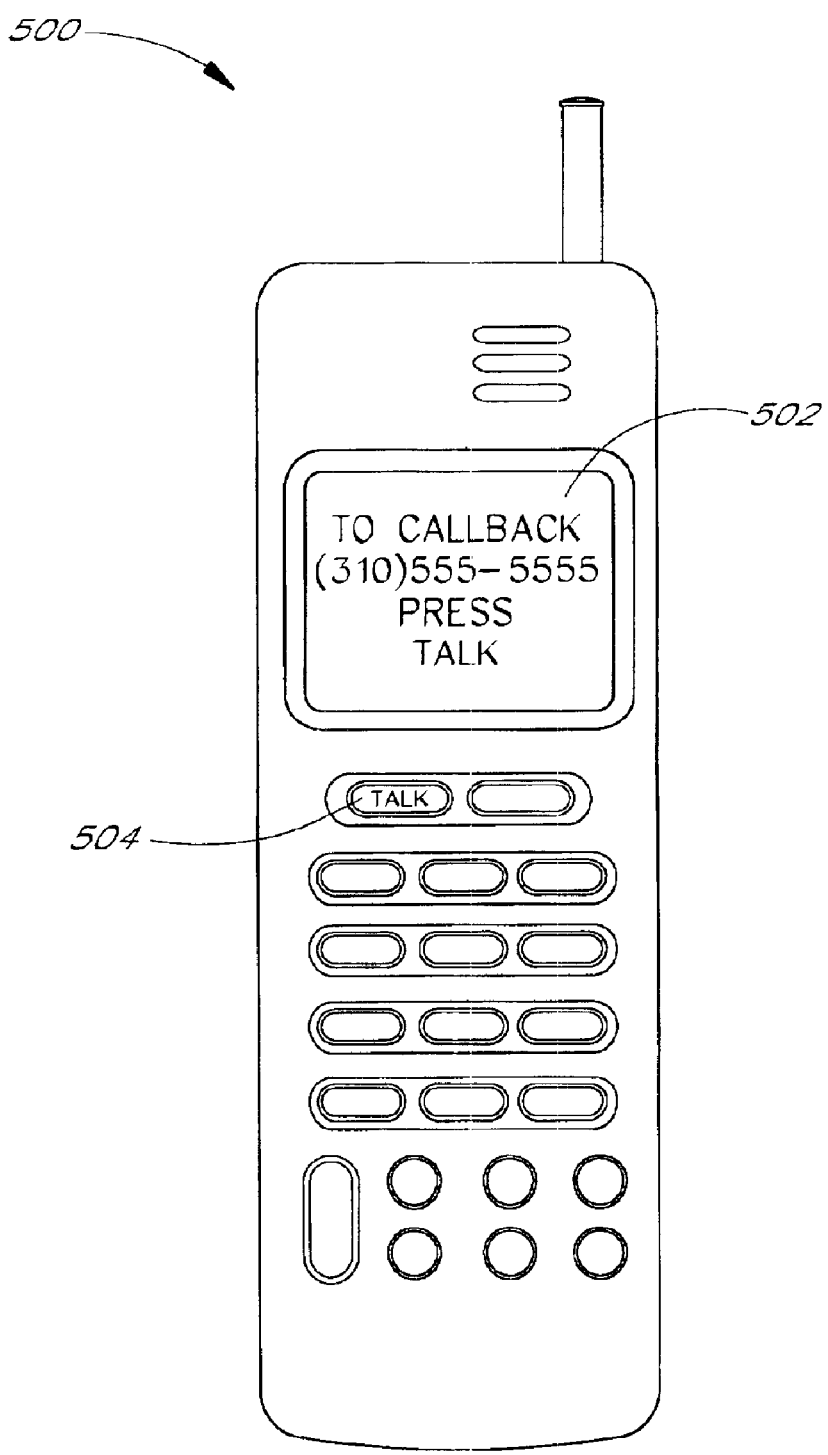
FIG. 5 illustrates an example callback notification.

FIG. 5 illustrates an example callback message displayed on a cellular phone 500. A display 502 displays the callback message received by the phone 500 via the SMS system. The display optionally includes Party A's name as determined from registration information stored in a user database. The message instructs the user to press the "talk" key 504 to initiate the callback process. Of course, the message may request different types of responses, including requesting activation of different keys or verbal responses.

Thus, as described above, the present invention provides systems and methods for a callback process that can be used with PSTN systems, wireless stations and the Internet to thereby greatly facilitate call completion.

Although this invention has been described in terms of certain preferred embodiments, other embodiments that are apparent to those of ordinary skill in the art are also within the scope of this invention.

What is claimed is:

1. An automated callback system, comprising:
   at least a first instruction configured to detect that a called party is accessing the Internet via a computer terminal using a first line;
   at least a second instruction configured to determine when the first line is busy, wherein the first line is busy because the computer terminal is using the first line;
   at least a third instruction configured to detect when the caller is using a wireless telephone to call the first line;
   at least a fourth instruction configured to determine when the first line is idle based at least in part on determining that the computer terminal has ceased accessing the Internet; and
   at least a fifth instruction configured to transmit a short message service (SMS) callback notification via email to the wireless telephone at least partly in response to the at least fourth instruction determining that the first line is idle, the callback notification including the called party's phone number.

2. The system as defined in claim 1, further comprising a sixth instruction configured to transmit a message to the computer terminal, the message including a phone number associated with the wireless phone.

3. The system as defined in claim 1, further comprising a sixth instruction configured to transmit a voice message from the caller over the Internet using Voice Over Internet Protocol to the computer terminal.

4. The system as defined in claim 1, further comprising a sixth instruction configured to determine if the SMS message transmission failed.

5. The system as defined in claim 4, further comprising:
   a seventh instruction configured to determine if the SMS message transmission failed because the email address is unknown; and
   an eighth instruction configured to store an indication that no further messages are to be sent to the unknown email address.

6. The system as defined in claim 4, further comprising a seventh instruction configured to determine if the SMS message transmission failed because a mailbox. associated with the wireless telephone is full and to store an indication that the SMS message transmission failed as a result of a transient condition.

7. The system as defined in claim 1, further comprising a sixth instruction configured to determine a phone number for the wireless telephone.

8. The system as defined in claim 1, further comprising a sixth instruction configured to determine an email address associated with the wireless telephone.

9. The system as defined in claim 1, further comprising a sixth instruction configured to record a message from the caner.

10. The system as defined in claim 1, further comprising a sixth instruction configured to transmit a second notification to the wireless telephone before transmitting the first notification, the second notification asking the caller if the caller wants to receive the first notification.

11. A method of processing a telecommunications call, the method comprising:
    detecting a presence of a first subscriber communicating on a computer network via a first computer terminal, wherein the first computer terminal communicates over the computer network using a first telecommunications line associated with a first telephone number;
    receiving a first call from a first caller calling via a wireless station, wherein the first call was initially directed to the first telecommunications line and then forwarded to a second telecommunications line because the first telecommunications line is busy, wherein the first telecommunications line is busy because the first computer terminal is using the first telecommunications line;
    receiving signaling information associated with the first call, the signaling information including at least a second telephone number, the second telephone number associated with the wireless station;
    determining when the first subscriber has ceased communicating on the computer network using the first computer terminal; and
    transmitting to the wireless station a message at least partly in response to determining that the first subscriber has ceased communicating on the computer network, the message including an instruction related to calling back the first telephone number.

12. The method as defined in claim 11, wherein the act of determining that the first subscriber has ceased communicating on the computer network includes receiving a log-off message from the first computer terminal.

13. The method as defined in claim 11, wherein the message is transmitted using a short message service.

14. The method as defined in claim 11, further comprising notifying the first caller that the message will be transmitted to the first caller when the first telecommunications line is free.

15. The method as defined in claim 11, wherein the instruction instructs the first caller to activate at least one of a "talk" key and a "send" key.

16. The method as defined in claim 11, further comprising:
   receiving a second call from a second caller, wherein the second call was initially directed to the first telecommunications line and then forwarded to the second telecommunications line;
   transmitting a message to the computer terminal providing information on both the first call and the second call; and
   receiving a selection from the subscriber indicating that the message should be transmitted only to one of the first caller and the second caller.

17. The method as defined in claim 11, further comprising transmitting a notification to the first computer terminal, wherein the notification indicates that the first caller has attempted to call the first subscriber.

18. The method as defined in claim 11, further comprising recording a voice message from the first caller and transmitting the voice message over the Internet to the first computer terminal before the first subscriber has ceased communicating on the computer network using the first computer terminal.

19. The method as defined in claim 11, further comprising:
   based at least in part on the wireless station's phone number and a Local Exchange Routing Guide, determining an identity of a carrier associated with the wireless station; and
   generating an email address associated with the wireless station based at least in part on the identity of the carrier and on the wireless station's phone number, wherein the message is transmitted to the email address.

20. The method as defined in claim 11, further comprising determining an email address associated with the wireless station from the wireless station's phone number using the ENUM protocol.

21. The method as defined in claim 11, further comprising determining that the wireless station is a wireless station based on the second telephone number and a Local Exchange Routing Guide.

22. A method of processing a telecommunications call, the method comprising:
   detecting a presence of a first subscriber accessing a computer network via a first computer terminal connected to a first telephone line;
   receiving from a calling telephone station a forwarded call intended by a caller for the first telephone line;
   receiving signaling information associated with the forwarded call, the signaling information including at least a telephone number associated with the calling telephone station;
   providing an indication to the calling telephone station that the first telephone line is busy;
   determining when the first subscriber is no longer accessing the computer network via the first computer terminal; and
   at least partly in response to determining that the first subscriber is no longer accessing the computer network via the first computer terminal, transmitting a first notification to the first caller, the first notification including callback information.

23. The method as defined in claim 22, wherein the callback information includes the telephone number.

24. The method as defined in claim 22, wherein the callback information includes the subscriber's name.

25. The method as defined in claim 22, further comprising enabling first subscriber to call back the calling telephone station using the callback information.

26. The method as defined in claim 22, wherein the act of detecting the presence of the first subscriber includes receiving periodic communications from a client application executing on the first computer terminal.

27. The method as defined in claim 22, wherein the first notification is emailed to an email address generated at least in part on the telephone number.

28. The method as defined in claim 22, wherein the first notification is transmitted using a short message service protocol.

29. The method as defined in claim 22, wherein the first notification is transmitted using a Wireless Application Protocol (WAP).

30. The method as defined in claim 22, wherein the calling telephone station is a cellular telephone.

31. The method as defined in claim 22, further comprising causing the first notification to be transmitted to a short message service center which routes the first notification to a mobile switching center based at least in part on information from a home location register.

32. The method as defined in claim 22, further comprising:
   causing the first notification to be transmitted to a short message service center which routes the first notification to mobile switching center;
   causing the first notification to be transmitted from the mobile switching center to a base station system; and
   causing the first notification to be transmitted from the base station system to the second telephone terminal.

33. A method of call processing, comprising:
   detecting that a first user is accessing a computer network using a first line;
   detecting that a second user is calling the first user when the first user's line is busy and the first user is accessing the computer network;
   determining that the second user is calling using a wireless station;
   detecting that the first user has ceased accessing the computer network; and
   at least partially in response to detecting that the first user has ceased accessing the computer network, enabling the second user to call the first line via the wireless station using a single key entry.

34. The call processing method as defined in claim 33, further comprising
   transmitting a message to the wireless station asking the second user if a callback procedure is to be performed; and
   receiving a response from the second user instructing that the callback procedure is to be performed.

35. The call processing method as defined in claim 33, further comprising communicating with a client application executing on a computer used by the first user to access the computer network, wherein the act of detecting that the user has ceased accessing the computer network includes determining that the client application has transmitted a log-off communication.

36. The call processing method as defined in claim 33, wherein the act of detecting when the second user is calling the first user when the first user's line is busy includes detecting that the second user's call to the first user is forwarded to another phone number.

37. The call processing method as defined in claim 33, further comprising:
  receiving a phone number associated with the wireless station;
  determining an identity of a carrier associated with the wireless station; and
  determining an email address associated with the wireless station based at least on the phone number associated with the wireless station and the carrier identity.

38. The call processing method as defined in claim 33, wherein the act of enabling the second user to call the first line further composes transmitting an email message to an email address associated with the wireless station, wherein the email message includes a phone number associated with the wireless station.

39. The call processing method as defined in claim 33, wherein the act of enabling the second user to call the first line further comprises transmitting a message to the wireless calling station, wherein the message is displayed using a browser.

40. A call processing system, comprising:
  a first instruction configured to detect when a first user is accessing a computer network using a first line;
  a second instruction configured to detect when a second user is calling the first user when the first line is busy;
  a third instruction configured to determine that the second user is calling using a wireless station;
  a fourth instruction configured to detect that the first user has ceased accessing the computer network; and
  a fifth instruction configured to transmit callback information to the wireless station at least partially in response to the fourth instruction detecting that the first user has ceased accessing the computer network.

41. The call processing system as defined in claim 40, further comprising a call manager server system configured to execute the first, second, third, fourth and fifth instruction.

42. The call processing system as defined in claim 41, further comprising a client application configured to be executed on a computer system connected to the first line and to transmit presence information to the call manager server system.

43. The call processing system as defined in claim 40, wherein the fifth instruction is further configured to include in the callback information a phone number associated with the first line.

44. The call processing system as defined in claim 40, further comprising a sixth instruction configured to transmit a notification via an instant messaging service to the first user, the notification including information related to the second user's call.

45. The call processing system as defined in claim 40, further comprising a sixth instruction configured to inhibit the transmission of the callback information to the wireless station at least partly in response to an instruction from the first user.

46. A method of providing line status information, comprising:
  receiving over a network presence information from a client application executing on a computer system accessing a first telephone line;
  receiving on a second telephone line a call intended by a caller to be connected to the first telephone line, wherein the call was forwarded to the second telephone line at least in part due to the computer system accessing the first telephone line;
  determining that computer system has ceased accessing the first telephone line; and
  transmitting a text notification to the caller at least partly in response to determining that computer system has ceased accessing the first telephone line.

47. The method as defined in claim 46, further comprising initiating a bridged call between the caller and the first telephone line.

48. The method as defined in claim 46, further comprising determining that the text notification was not received by the caller.

49. The method as defined in claim 46 further comprising transmitting a text notification failure message to the first telephone line at least partly in response to determining that the text notification was not received by the caller.

50. The method as defined in claim 46, further comprising:
  recording a voice message from the caller; and
  transmitting the recorded voice message and a text message related to the caller's call to the computer system.

51. The method as defined in claim 46, wherein the text notification is transmitted to the caller using a short message service (SMS).

52. The method as defined in claim 46, wherein the text notification is transmitted to a wireline telephone associated with the caller.

53. The method as defined in claim 46, wherein the text notification is transmitted to the caller using Wireless Application Protocol (WAP).

54. The method as defined in claim 46, further comprising providing a voice prompt to the caller, the voice prompt instructing the caller to take a first action in order to have the text notification transmitted to the caller.

55. A method of providing line status information, comprising:
  receiving over a network presence information from a client application executing on a computer system accessing a first telephone line;
  receiving on a second telephone line a call intended by a caller to be connected to the first telephone line, wherein the call was forwarded to the second telephone line at least in part due to the computer system accessing the first telephone line;
  determining that computer system has ceased accessing the first telephone line; and
  bridging a call between the first telephone line and the caller at least partly in response to determining that computer system has ceased accessing the first telephone line.

56. A calling system, comprising:
  a call manager system configured to receive presence information from a client application executing on a computer system accessing a first telephone line, and configured to receive a forwarded call intended by a caller to be connected to the first telephone line, wherein the call manager is further configured to determine that the computer system has ceased accessing the first telephone line and to transmit a notification to the caller at least partly in response to determining that computer system has ceased accessing the first telephone line; and
  the client application, wherein the client application is configured to provide the presence information to the call manager system.

57. A method of processing a telecommunication call, the method comprising:

receiving over a switched network at a call processing system a first call from a caller intended for a called party;

determining that a telecommunications line associated with the called party is unavailable to take the call;

determining that the caller is using a wireless station;

providing a text indication to the caller via the wireless station that the called part is unavailable;

determining that the telecommunications line associated with the called party is available to take at least a first call; and at least partly in response to determining that the telecommunications line associated with the called party is available to take at least a first call, transmitting a notification to the wireless station, the notification including callback information.

58. The method as defined in claim 57, further comprising;

receiving an instruction from the caller to perform a callback operation; and initiating a callback operation in response to the caller instruction.

59. The call processing system as defined in claim 57 wherein the text notification is transmitted using a Wireless Application Protocol (WAP).

60. The call processing system as defined in claim 57 wherein the text notification is transmitted using a short message service (SMS).

61. The call processing system as defined in claim 57 wherein the text notification is transmitted using an email.

62. The method as defined in claim 57, wherein the wireless station is a cellular telephone.

63. A method of processing a telecommunications call, the method comprising:

receiving a first call from a first caller calling via a wireless phone, wherein the first call was initially directed to a first telecommunications line associated with a first telephone number, and then forwarded to a second telecommunications line as a result of a first condition; and transmitting to the wireless phone a short message service (SMS) message at least partly in response to determining that the first subscriber is available to receive a second call, the message including an instruction related to connecting to the first telecommunications line.

64. The method as defined in claim 63, wherein the occurrence of the first condition is determined based at least in part on network presence information from a client application executing on a computer system accessing the first telecommunications line.

65. The method as defined in claim 63, further comprising:

receiving signaling information associated with the first call, the signaling information including a second telephone number, the second telephone number associated with the wireless station;

placing a second call to the first telecommunications line in response to a first caller instruction; and bridging the first call and the second call.

66. The method as defined in claim 63, wherein the first condition is a busy condition.

67. The method as defined in claim 63, wherein the wireless phone is a cellular phone.

68. A method of providing line status information, comprising:

receiving on a first telephone line a first call from a caller calling via a wireless phone, wherein the first call is intended for a user associated with an unavailable second telephone line;

transmitting a text notification to the wireless phone at least partly in response to determining that the second telephone line has become available, the text ,notification indicating that the caller can now be connected to the second telephone line; and initiating a bridged call between the wireless phone and the second telephone line at least partly in response to an instruction from the caller.

69. The method as defined in claim 68, wherein the first call is transmitted via a cellular phone system.

70. The method as defined in claim 68, wherein the text notification is a short message service (SMS) message.

71. The method as defined in claim 68, wherein the text notification is emailed to the wireless phone.

72. A calling processing system, comprising:

a call bridging system configured to:

determine that a called party is unavailable to receive a first call from a wireless telephone;

determine that the called party has become available to receive the first call;

transmit a text notification to the wireless telephone indicating that the called party has become available;

receive an indication via the wireless phone that the caller wants to be connected to the called party;

initiate a second call to the called party and a third call to the wireless telephone at least partly in response to the indication, cause the second call and the third call to be bridged; and a telephone line interface coupled to the call bridging system, the telephone line interface used to place at least one of the second and third calls.

73. The call processing system as defined in claim 72 wherein the text notification is transmitted using a Wireless Application Protocol (WAP).

74. The call processing system as defined in claim 72 wherein the text notification is transmitted using a short message service (SMS).

75. The call processing system as defined in claim 72 wherein the text notification is transmitted using an email.

* * * * *

UNITED STATES PATENT AND TRADEMARK OFFICE
CERTIFICATE OF CORRECTION

PATENT NO. : 6,879,677 B2
APPLICATION NO. : 10/029509
DATED : April 12, 2005
INVENTOR(S) : David S. Trandal et al.

It is certified that error appears in the above-identified patent and that said Letters Patent is hereby corrected as shown below:

At Column 14, Line 10: In Claim 6, after "mailbox" delete ".".

At Column 14, Line 22: In Claim 9, delete "caner" and insert -- caller --, therefor.

At Column 17, Line 13: In Claim 38, delete "composes" and insert

-- comprises --, therefor.

At Column 17, Line 26: In Claim 40, delete "," and insert -- ; --, therefor.

At Column 17, Line 38: In Claim 41, after "fourth" insert -- , --.

At Column 19, Line 8: In Claim 57, delete "part" and insert -- party --, therefor.

At Column 20, Line 19: In Claim 68, delete "," before "notification".

At Column 20, Line 42: In Claim 72, after "indication" delete "," and insert -- ; --, therefor.

Signed and Sealed this

Eleventh Day of March, 2008

JON W. DUDAS
*Director of the United States Patent and Trademark Office*